Figure 1:
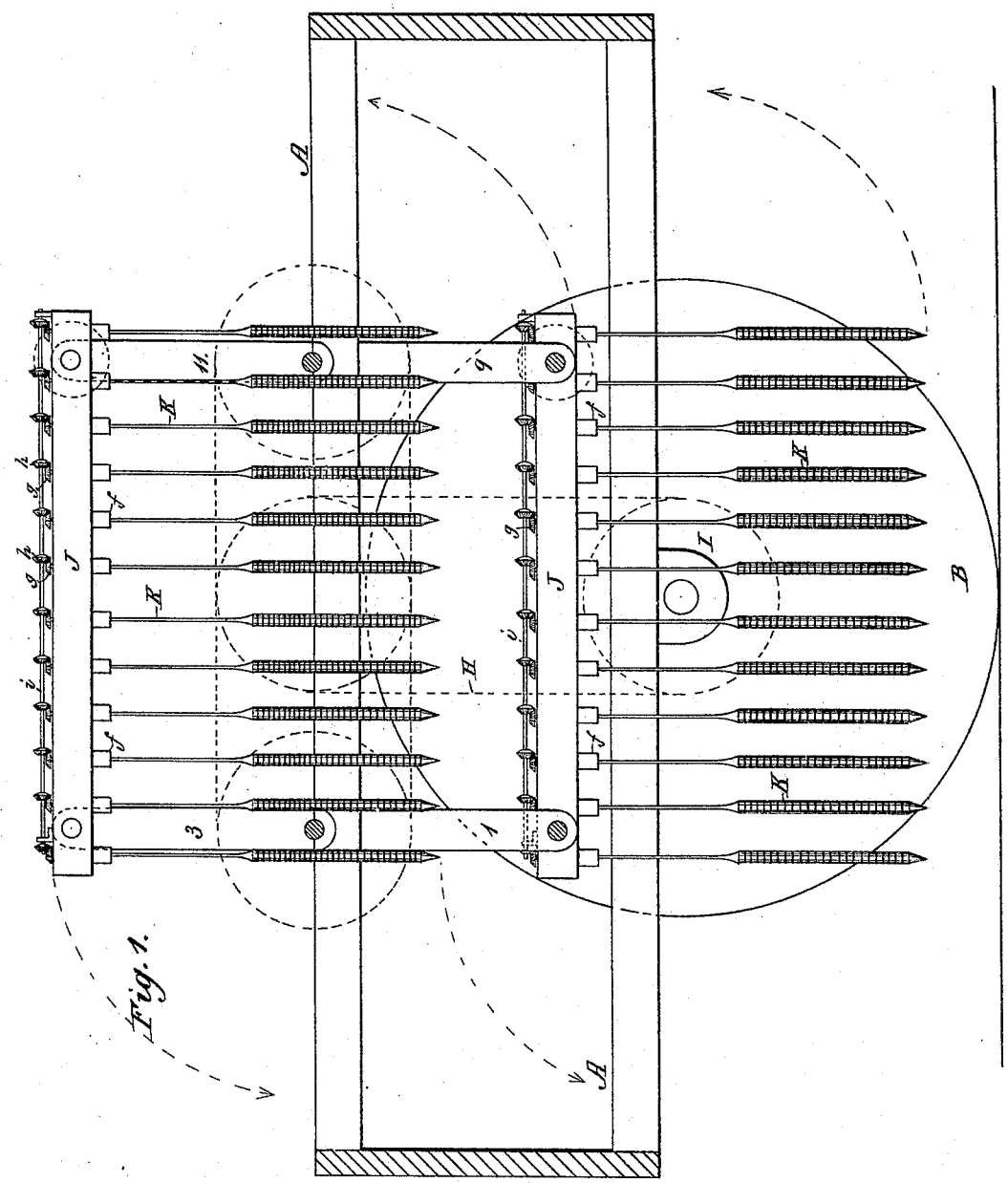

(No Model.)

2 Sheets—Sheet 1.

C. T. MASON, Jr.
COTTON HARVESTER.

No. 286,032. Patented Oct. 2, 1883.

WITNESSES:
W. W. Hollingsworth
Edw. G. Byrn

INVENTOR:
Chas. T. Mason Jr.
BY Munn & Co
ATTORNEYS.

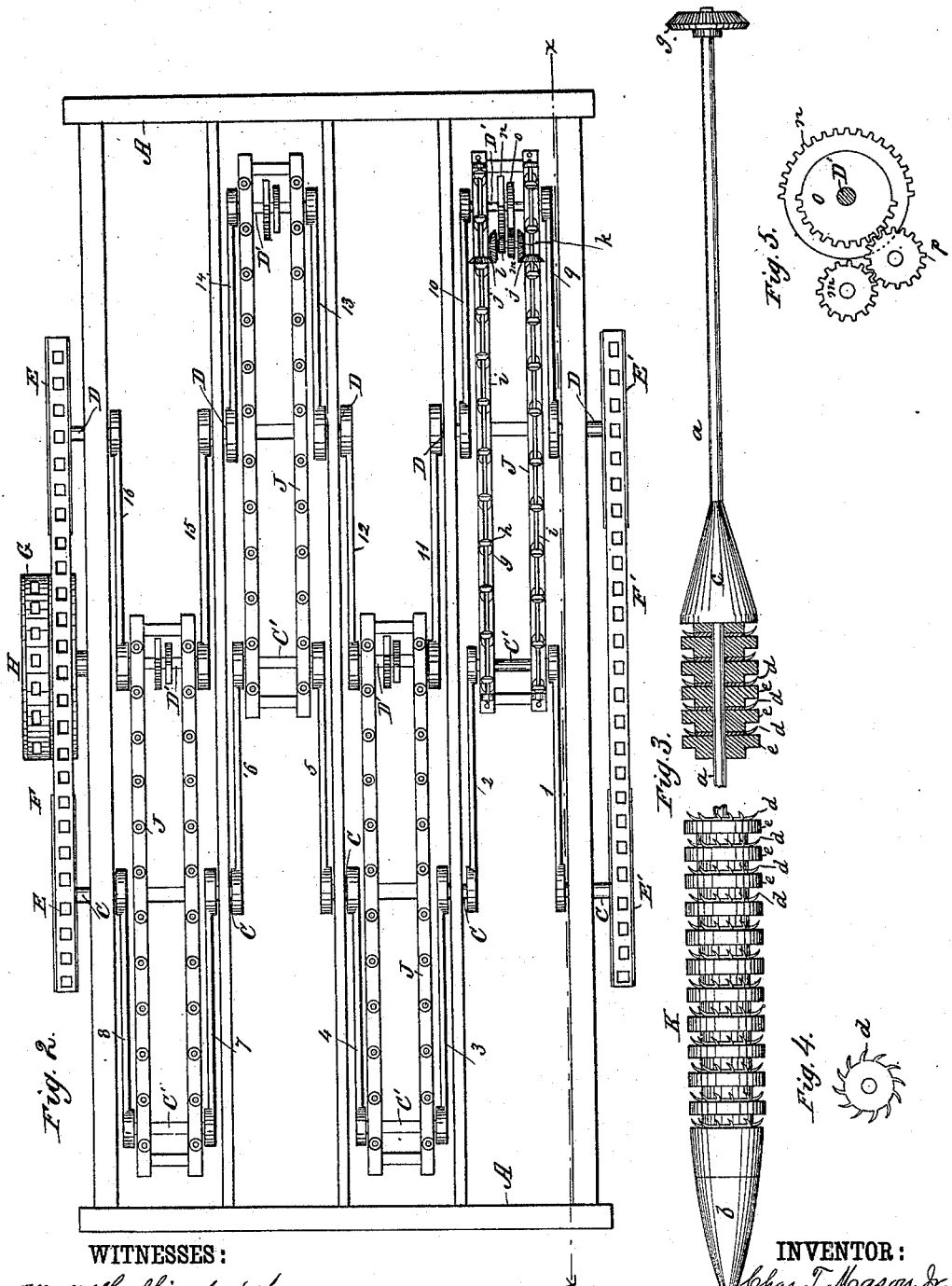

UNITED STATES PATENT OFFICE.

CHARLES T. MASON, JR., OF SUMTER, SOUTH CAROLINA.

COTTON-HARVESTER.

SPECIFICATION forming part of Letters Patent No. 286,032, dated October 2, 1883.

Application filed December 16, 1882. (No model.)

*To all whom it may concern:*

Be it known that I, CHARLES T. MASON, Jr., of Sumter, in the county of Sumter and State of South Carolina, have invented a new and useful Improvement in Cotton-Harvesters; and I do hereby declare that the following is a full, clear, and exact description of the same, reference being had to the accompanying drawings, forming part of this specification, in which—

Figure 1 is a side view with the frame in section through the line $xx$ of Fig. 2, the crank-arms being in vertical position. Fig. 2 is a plan view with the crank-arms in horizontal position. Fig. 3 is an enlarged detail of one of the picker-stems, shown partly in section. Figs. 4 and 5 are other details.

The object of my invention is to provide a practical machine for picking cotton in the fields, and thereby avoid the slow, laborious, and expensive method of picking by hand.

Many efforts have been made to construct a successful cotton-picker; but the practical difficulties are numerous, and the peculiar requirements of the work are such as to compel even to this day an almost entire reliance upon hand-picking. A successful machine-picker must be one which will take all, or nearly all of the cotton from the plants. It must not pull up or mutilate the plants nor shatter the bolls and stems so as to mix the particles with the picked cotton; but perhaps the most important requirement of a successful machine is that it shall be so constructed that while its teeth shall be made sufficiently numerous and delicate to remove the cotton from the bolls, they shall be so protected as not to be quickly worn out, destroyed, or mutilated with the frequent abrasions against the tough stalks, bolls, &c., to which they are inevitably subjected. My invention aims more particularly at a satisfactory consummation of this last result, and accomplishes the same to an extent which will, as I believe, entirely revolutionize the present mode of hand-picking. In organizing my machine, I adopt the general system of a set of numerous pendent picker-stems, which maintain always a vertical position and dip down into the bush from above, and have a slow rotation to the rear about a horizontal axis while down, so as to compensate for the advance of the machine, and thus insure the rising vertically from the same bush into which they entered without any side strain on the bush or the picker-stems. This general plan has heretofore been employed, and I make no claim to it, broadly.

My invention consists in the peculiar construction of the picker-stems, their arrangement for a revolution about their individual axes, and in their general organization for their revolution in gangs in entering and leaving the bushes.

I will now proceed to describe my invention with reference to the drawings, in which similar letters indicate corresponding parts in the several figures.

In the drawings, A represents the main frame of the machine, which is mounted to travel upon running wheels B. Upon this frame are arranged transversely in bearings two cranked shafts, one of which is composed of short shaft-sections C C C and crank-arms 1 2 3 4 5 6 7 8, connected at their ends by short rods C′ C′ C′, and the other of which crank-shafts is composed of short shaft-sections D D D and crank-arms 9 10 11 12 13 14 15 16, connected at their ends by short rods D′ D′ D′. These two crank-shafts have at each end chain-wheels E E′ E′, which are connected together in pairs by chains F F′. For driving these crank-shafts a double chain-pulley, G, is arranged with one set of its teeth meshing into the chain F, and its other set of teeth geared into a chain, H, (see dotted lines, Fig. 1,) which extends down to a chain-wheel, I, on the axle of the main running wheels B, and imparts therefrom to the crank-shafts the power required to rotate them.

The frame A is composed of a series of parallel bars arranged longitudinally or in the line of draft, and between each of these bars is arranged a picker-frame, J, composed of parallel bars bearing two rows of downwardly-projecting pendent picker-stems, K. These picker-frames are journaled at one end on the short rods C′ of one crank-shaft, and at the other end on the short rods D′ of the other crank-shaft, so that as the crank-shafts revolve the picker-frames are carried in parallel relation to each other with their pendent stems downwardly in front, then to the rear and up again, then forward at the top and down again, causing the picker-stems to penetrate the cotton-bushes and rise vertically therefrom again without any dragging or lateral motion in the bushes, the rear motion of the lower set of picker-stems from the revolution of the crank-shafts being sufficient to offset the advance movement of the machine.

In constructing the picker-stems, I form them of a straight, slightly-elastic metal rod, $a$, (see Fig. 3,) with a conical point, $b$, at the lower end, a conical cap, $c$, above, and intermediate toothed metal disks, $d$, Fig. 4, and wooden disks $e$, alternating with each other between the conical point and cap. The object of the conical point and cap is to enable the stem to readily penetrate and leave the bushes without catching. The metal disks have at their peripheries sharp teeth or hooks that are slightly bent or curved in the direction of their rotation, while the disks $e$, which may be made of wood or any suitable material, are shouldered to form grooves between their edges, in which rest the hooked teeth of the metal disks. The diameter of the wooden disks is at least equal to, but preferably greater than, that of the metal disks, even at the extreme points of their teeth, so that any hard substance—like the stalk of the plant—which strikes one of the stems does not touch the teeth at all, but strikes against the edges of the wooden disks, which act as guards to protect said teeth. While this is the case, however, with any hard substance the soft cotton fiber presses between the disks and is caught by the teeth and drawn out of the boll. In this connection the value of forming a space between the disks at their peripheries, or offsetting them from the rows of the points of the teeth, becomes apparent, for when the disks are made to act as guards, by reason of their diameter being equal to or greater than that of the teeth, the cotton will not be seized by the teeth unless there is some space on the sides between the teeth and the disks which permits the soft cotton fiber to press down into the same into contact with the teeth; and here, also, appears a distinctive advantage between my invention and others which have preceded it, in which the disks are flush against the sides of the teeth, and of less diameter than the series of teeth. This, it will be seen, is a very important feature of my invention, for by it the teeth cannot cut up the stalk or boll and fill the cotton with splinters, on the one hand, while on the other hand the stalks cannot damage the delicate teeth and render the machine inoperative, as it otherwise would in a very short space of time.

The metal disks may be cut, with their teeth, from sheet metal, or they may be made of wire, bent to the required shape. In any case they should be made of brass or some metal or alloy that does not corrode or rust readily, for the cotton is frequently damp in the bolls, and rust upon an iron or steel tooth would soon destroy its value, and as these teeth are of delicate and expensive structure this becomes an important item in the longevity of the machine. As these picker-stems descend into the bushes they spring to one side or the other of the stalks, as the case may be, by reason of the elasticity of their central rods, $a$; but at the upper ends of the rods they are held stiffly in a long bearing, $f$, on the under side of the picker-frames.

In my invention I give to the picker-stems, when they are nearing their lowest point, a rotary motion about their longitudinal axes in the direction in which the hooks of the disks are pointing, and after they rise from the bushes the direction of the rotation is reversed, so as to release the teeth from the cotton and allow the latter to be removed and collected. For this purpose each one of the picker-stems has its rod $a$ at the top detachably connected to a small bevel-wheel, $g$, which engages with a bevel-wheel, $h$, on the shafts $i$ $i$, of which there is one for each of the two rows of stems in each picker-frame. The shafts $i$ are arranged horizontally above the picker-frames, and are rotated by two bevel-gears, $j$ $j$, on the opposite ends of a short shaft, $k$. This shaft bears two small pinions, $l$ and $m$. One of these, $l$, engages directly with a segmental gear-wheel, $n$, and the other, $m$, engages indirectly with a segmental gear-wheel, $o$, through an intermediate pinion, $p$. (See Fig. 5.) The segmental gear-wheels are rigid on the shafts $D'$, and the shafts $D'$ are rigidly fixed to the arms 9 to 16, so that as these arms travel around the crank-shafts the segmental gear-wheels $n$ and $o$ also turn on their own axes. The gear-teeth on these wheels $n$ and $o$ are so disposed in segments that during one part of the revolution, or while the picker-stems are down, one of these segmental gears, $n$, turns pinion $l$ and rotates shafts $k$ and $i$ in one direction, and during the other part of the revolution the other segmental wheel, $o$, through pinion $p$, reverses the revolution of shafts $k$ and $i$.

It will be seen that I have not described any means for relieving the picker-stems of their load of cotton. The means for accomplishing this I propose to make the subject-matter of a separate application.

Now, as before stated, I do not claim, broadly, the picker-stems arranged to revolve in sets about a horizontal axis; and I am aware, also, that the stems have been arranged in that connection to revolve on their individual axes.

What I claim is—

1. A cotton-picker consisting of the parallel moving frames J, combined with and mounted upon the crank-shafts, the vertical rotary picker-stems K K, having bevel-wheels at their upper ends, the horizontal shafts $i$ $i$, with bevel-wheels gearing therewith, and gearing, substantially as described, for transmitting power from the crank-shafts to rotate the picker-stems on their axes, as set forth.

2. A cotton-picker having sets of picker-stems, which sets revolve about a horizontal axis, in combination with means for imparting to said stems an independent rotation about their individual axes first in one direction and then in the other, substantially as described, and for the purpose set forth.

3. A cotton-picker stem having a series of hooks or teeth and alternating guards, the engaging ends of said hooks or teeth being disposed even with or slightly below the surface of said guards, and the said guards being spaced or offset from the points of the teeth, to permit the cotton to press in between the guards and catch into the teeth, substantially as described.

4. The cotton-picker stem composed of a central rod, $a$, and alternating toothed disks, and shouldered disks of greater diameter than the toothed disks, as described.

5. The combination of the elastic rod $a$, having conical point $b$, the conical cap $c$, toothed metal disks $d$, and guard-disks $e$, arranged substantially as described.

6. The combination, with the parallel barred frame A, of the two cranked axles C and D, the picker-frames journaled at opposite ends on the cranks of said axles, to maintain them in parallel position while rotating, and the picker-stems depending from the picker-frames, substantially as and for the purpose described.

7. The combination, with the picker-stems having bevel-wheels at their upper ends, the picker-frames, and crank-shafts, of the shafts $i$, bearing bevel-pinions, shaft $k$, bearing bevel-pinions $j\ j$, and pinions $l$ and $m$, the segmental gears $n$ and $o$, made rigid on the crank-shafts, and the idle-pinion $p$, for reversing the rotation of the picker-stems, as shown and described.

The above specification of my invention signed by me in the presence of two subscribing witnesses.

CHARLES T. MASON, JR.

Witnesses:
EDWD. W. BYRN,
SOLON C. KEMON.